March 16, 1954     B. C. ROEHRL     2,671,983
TOY AIRPLANE
Filed July 13, 1951
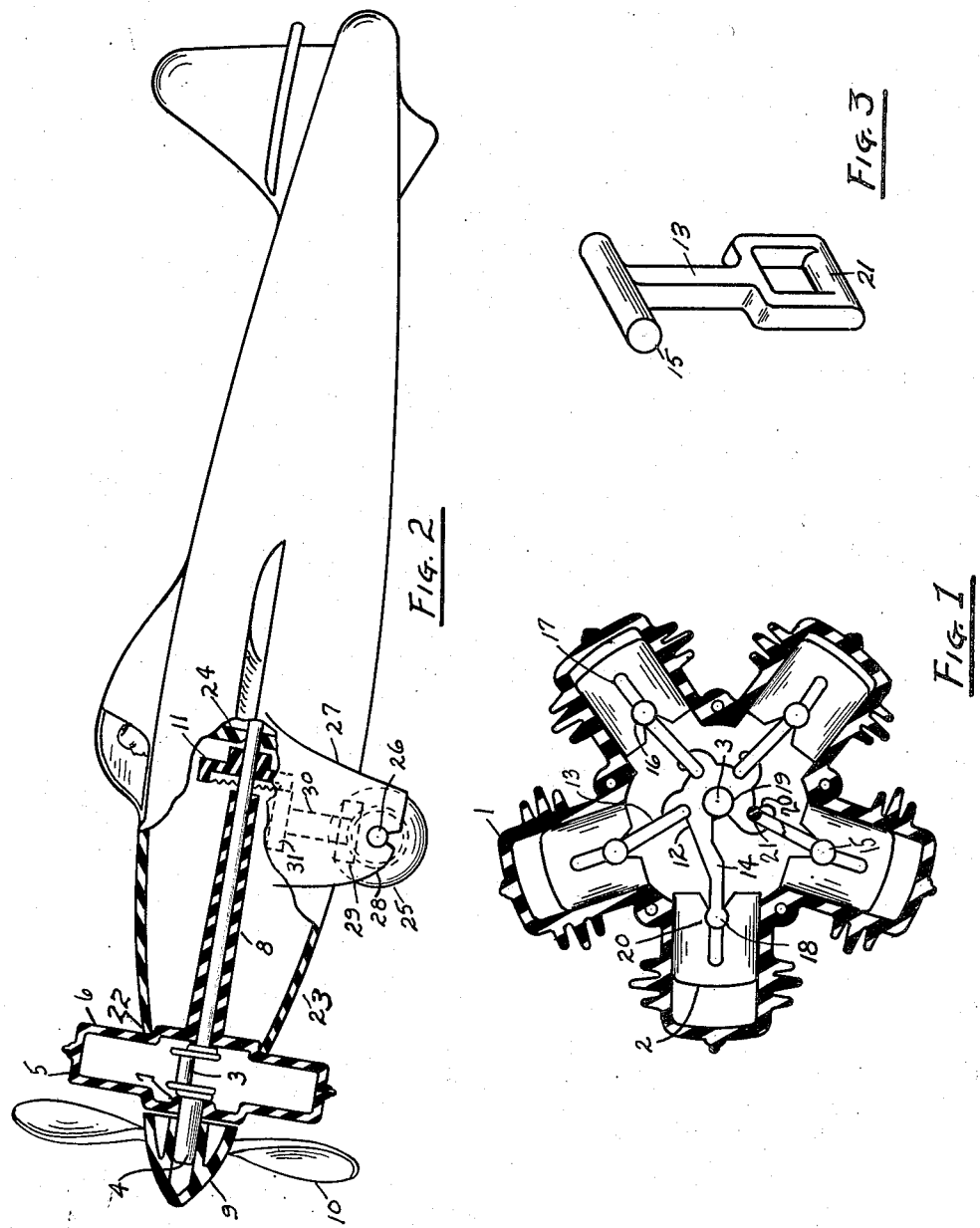
Inventor
Bruno C. Roehrl
By Ralph Hammar
Attorney Patented Mar. 16, 1954

2,671,983

UNITED STATES PATENT OFFICE 2,671,983

TOY AIRPLANE

Bruno C. Roehrl, Erie, Pa., assignor to Nosco Plastics, Erie, Pa., a corporation of Pennsylvania Application July 13, 1951, Serial No. 236,599

1 Claim. (Cl. 46—76)

This invention is intended to provide an engine toy of the type having a plurality of angularly spaced radial cylinders. Features include a master connecting rod for operating two or more of the pistons from a single crank throw which can be easily assembled. In a preferred form, the engine block is transparent so the reciprocation of the pistons as the crankshaft is rotated simulates the engine operation. When applied to toy aircraft, the operation of an aircraft engine and propeller during taxiing is simulated by having a gear drive from the landing wheels to the engine crankshaft.

In the accompanying drawing, Fig. 1 is a sectional view of a radial aircraft engine, Fig. 2 is a side elevation of a toy aircraft, partly in section with the connecting rod and pistons removed, and Fig. 3 is an elevation of one of the connecting rods connected to an eccentric loop on the master connecting rod.

In the drawings, there is shown an engine having a plurality of angularly spaced radial cylinders 1 in each of which there is a piston 2. The particular engine illustrated is a radial aircraft engine where all of the pistons 2 are to be operated from a single crank throw 3 on a crankshaft 4. If the engine were of the multi-row radial or V type, there would be two or more crank throws each of which operated the pistons in its plane. The cylinder block is conveniently made in front and rear halves 5 and 6 containing respectively the front main bearing 7 and the rear main bearing 8 for the crankshaft. The cylinder block can be moulded of transparent plastic so that the operation of the pistons within the cylinders will be readily visible from the outside. It is more convenient to make the entire block of transparent material than to provide windows or cut-out portions which would make the reciprocation of the pistons visible. On the front end of the crankshaft, which projects out through the front main bearing 7, is fixed the hub 9 of an aircraft propeller 10. On the rear end of the crankshaft, which projects out through the main rear bearing 8, is fixed a gear 11 by which the crankshaft may be rotated.

The driving connection between the crank throw 3 and the pistons 2 is effected by a master connecting rod 12 and a plurality of individual connecting rods 13. The master connecting rod has rigid with it a connecting rod 14, which can be connected to any one of the pistons 2 and serves the same function as the connecting rods 13. As shown more clearly in Fig. 3, the connecting rods 13 have integral wrist pins 15 which snap into the wrist pin bearings 16 in open-ended slots 17 in the pistons 2. A similar wrist pin 18 is integral with connecting rod 14 on the master connecting rod. The master connecting rod has a C-shaped slot 19 concentric with the crank pin 3. Eccentric of the crank pin 3 are a plurality of C-shaped slots 20 which can be snapped onto pintles 21 at the lower end of the connecting rods 13. By reason of the C-shaped slots 19 and 20 the assembly of the master connecting rod 12 to the crank pin 3 and to the pintles 21 of the connecting rods 13 is greatly simplified. The snap connection provides an adequate pivotal mechanical connection which can be easily and quickly made. Furthermore, the master connecting rod 12 and the connecting rods 13 can all be moulded in dies without any retractable cores. This is an important feature in toys where constructions which permit low-cost manufacture are of prime importance.

The engine is mounted on the nose 22 of an aircraft fuselage 23, the rear end of the crankshaft 4 being carried in a bearing 24. The aircraft may be pulled about on landing wheels 25 fixed to an axle 26 journaled in depending skirts 27. On the axle is fixed a crown gear 28 which meshes with a gear 29 on a vertical counter-shaft 30 suitably journaled in the aircraft fuselage. On the upper end of the counter-shaft 30 is a gear 31 which meshes with the gear 11 fixed on the crankshaft so that as the aircraft is pulled about, the crankshaft is driven from the wheels 25 by the gear train 28, 29, 31, 11. Upon rotation of the crankshaft, the pistons reciprocate in the cylinders thereby simulating the operation of the engine and at the same time the propeller 10 rotates. The pistons and connecting rods are ordinarily made of opaque material so that the pistons are clearly visible. This produces the desired animated effect. The toy has a long life because the moving pistons and connecting rods are not accessible.

What is claimed as new is:

A toy aircraft having a fuselage with wheels and a simulated engine comprising a transparent radial engine block having angularly spaced cylinders with pistons therein, a crank-shaft journaled in the block with a crank pin opposite the cylinders, and connecting rods between the cylinders and crank pin including a master connecting rod and at least one individual connecting rod, said master connecting rod having a C-slot therein concentric with the crank pin and having a snap fit thereon and said master connecting rod having at least one C-slot eccentric of the crank pin and having a snap fit on a pintle of said individual connecting rod, said crankshaft pistons and connecting rods being visible through the engine block, and a driving connection between the wheels and crankshaft whereby as the aircraft is moved over a surface the pistons and connecting rods reciprocate and simulate the operation of an aircraft engine.

BRUNO C. ROEHRL.

References Cited in the file of this patent

UNITED STATES PATENTS

| Number | Name | Date |
|---|---|---|
| 1,392,561 | Duffy | Oct. 4, 1921 |
| 1,764,732 | Kraeft | June 17, 1930 |
| 1,804,313 | Brubaker | May 5, 1931 |
| 1,820,905 | Block | Sept. 1, 1931 |
| 1,856,538 | Case | May 3, 1932 |
| 2,035,081 | Lower | Mar. 24, 1936 |
| 2,058,265 | Selley | Oct. 20, 1936 |
| 2,425,156 | Knight | Aug. 5, 1947 |
| 2,517,084 | Carver | Aug. 1, 1950 |
| 2,601,742 | Kusold | July 1, 1952 |

FOREIGN PATENTS

| Number | Country | Date |
|---|---|---|
| 461,352 | Germany | June 19, 1928 |